US007546305B2

(12) United States Patent
Sathyanarayan

(10) Patent No.: US 7,546,305 B2
(45) Date of Patent: Jun. 9, 2009

(54) FILE ARCHIVAL

(75) Inventor: Ramaprakash H. Sathyanarayan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 229 days.

(21) Appl. No.: 09/834,833

(22) Filed: Apr. 13, 2001

(65) Prior Publication Data
US 2002/0152194 A1 Oct. 17, 2002

(51) Int. Cl.
*G06F 17/00* (2006.01)
(52) U.S. Cl. .................. 707/101; 707/102; 707/103 R; 707/104.1
(58) Field of Classification Search ......... 707/200–206, 707/100–104.1, 1–10
See application file for complete search history.

(56) References Cited

U.S. PATENT DOCUMENTS

| 5,274,696 | A | * | 12/1993 | Perelman | 379/235 |
| 5,544,346 | A |   | 8/1996  | Amini et al. | 395/481 |
| 5,652,883 | A |   | 7/1997  | Adcock | 395/622 |
| 5,717,951 | A | * | 2/1998  | Yabumoto | 707/100 |
| 5,764,972 | A | * | 6/1998  | Crouse et al. | 707/1 |
| 5,832,510 | A | * | 11/1998 | Ito et al. | 707/201 |
| 6,003,044 | A |   | 12/1999 | Pongracz et al. | 707/204 |
| 6,366,987 | B1 | * | 4/2002 | Tzelnic et al. | 711/162 |

(Continued)

FOREIGN PATENT DOCUMENTS

JP 62-254229 11/1987

(Continued)

OTHER PUBLICATIONS

"man page-tar", http://campuscgi.princeton.edu/man?tar, (printed from web on Jul. 27, 2001) 11 pages.

(Continued)

*Primary Examiner*—Isaac M Woo
(74) *Attorney, Agent, or Firm*—Silicon Valley Patent Group LLP; Omkar Suryadevara

(57) ABSTRACT

Archival in a computer is performed by creating a process if an item to be copied is a directory, and alternatively by copying the item if the item is a file. The created process in turn recursively performs the just-described acts, e.g. the act of creating or copying, with another item located in the just-described directory. Therefore, depending on the number of directories to be copied, a corresponding number of processes may be created, which speeds up copying. A default limit on a resource available to a copy process may be set to a maximum limit for the resource, for speedy copying. Archival may be speeded up by transferring data from the file into a temporary buffer, locking the temporary buffer, and invoking a direct memory access (DMA) process. Archival may be speeded up also by checking for and eliminating the copying of circular links (such as a symbolic link that points to itself). Such a created process may send an email message if a resource at a destination is full, and wait to be restarted subsequent to sending the email message. A user that receives the email message makes appropriate arrangements (e.g. deletes files in a destination disk or loads a new disk), and therafter restarts the stopped process. On being restarted, the process recopies a file if it was in the middle of copying the file when it was stopped.

42 Claims, 3 Drawing Sheets

U.S. PATENT DOCUMENTS

| | | | |
|---|---|---|---|
| 6,378,054 B1 | 4/2002 | Karasudani et al. | 711/161 |
| 6,408,298 B1* | 6/2002 | Van et al. | 707/10 |
| 6,473,767 B1* | 10/2002 | Bailey et al. | 707/203 |
| 6,505,214 B1* | 1/2003 | Sherman et al. | 707/201 |
| 6,553,486 B1* | 4/2003 | Ansari | 712/222 |
| 6,779,003 B1* | 8/2004 | Midgley et al. | 707/204 |

FOREIGN PATENT DOCUMENTS

JP         62-254229 A     11/1987

OTHER PUBLICATIONS

"man page-cpio", http://campuscgi.princeton.edu/man?cpio, (printed from web on Jul. 27, 2001) 10 pages.

"man-page-pax", http://campuscgi.princeton.edu/man?pax, (printed from web on Jul. 27, 2001) 11 pages.

Office Action in Chinese Patent Application 02811985.1, dated Oct. 14, 2005, 7 pages.

3rd Office Action in Chinese Patent Application 02811985.1, dated Sep. 22, 2006, 6 pages.

2nd Office Action in Chinese Patent Application 02811985.1, dated May 26, 2006, 4 pages.

PCT Corrected International Preliminary Examination Report, PCT/US02/11707, dated Oct. 9, 2003, 15 pages.

PCT Written Opinion, PCT/US02/11707, dated Mar. 18, 2003, 5 pages.

International Search Report, PCT/US02/11707, dated Jun. 12, 2002, 1 page including International Publication No. WO 02/084493 A1, Nov. 4, 2002, (25 pages total).

PCT International Preliminary Examination Report, PCT/US02/11707, dated Jul. 24, 2003, (13 total pages).

"Response to the Written Opinion in the International Preliminary Examination and Amendment Under Article 34", dated May 12, 2003, pp. 1-7, and Replacement pp. 15-19 and 19/1 and 19/2.

Office Action in Indian Patent Application No. 01306/KOL NP/03, dated Sep. 10, 2004, 1 page.

1st Amendment in Indian Patent Application No. 01306/KOL NP/03, dated Sep. 2, 2005, 11 pages.

2nd Amendment in Indian Patent Application No. 01306/KOL NP/03, dated Dec. 4, 2007, 7 pages.

Kullick et al, WO 94/17474, entitled "Apparatus and Method For Backing Up Data From Networked Computer Storage Devices", dated Aug. 4, 1994.

Hiroyuki, Japanese Patent Laying-Open No. 05-151179 entitled "Processing Assigning System" dated Jun. 18, 1993, including an Abstract (only) in English.

Tanaka, "Quota Manager Managing Directory Capacity for Windows NT", published in LAN Times, Japan, Softbank Corporation, dated Apr. 1, 1997, vol. 7, No. 4, pp. 196-199, including a Partial English Translation (1 page).

1st Office Action in Japanese Patent Application No. 582366/2002, dated Sep. 2, 2008 (2 pages), including a Complete English Translation (3 pages).

1st Amendment in Austrailain Patent Application No. 2002252661, dated Jun. 2, 2008, 15 pages.

Office Action in Australian Patent Application No. 2002252661, dated Jun. 1, 2007, 8 pages.

* cited by examiner

FILE ARCHIVAL

BACKGROUND

Two file archiving utilities for the Unix operating system are CPIO (copy in/out) and TAR (tape archiver). Both utilities can be used for backing up systems, or just to create file archives. They were originally intended to be used with a tape device, although, both create archive files on disk. Another utility, DUMP may also be used to backup a filesystem. A corresponding utility RESTORE restores data from a DUMP backup. RESTORE may be used interactively, to restore only certain files or directories.

In BSD Unix, the TAR utility is implemented as a front-end to the utility PAX. PAX (in one mode) copies file operands to a destination directory. A file operand specifies the pathname of a file to be copied or archived. When a file operand does not select at least one archive member, PAX writes these file operand pathnames in a diagnostic message to standard error and then exits with a non-zero exit status. When no file operands are specified, a list of files to copy with one per line is read from the standard input. When a file operand is a directory, the entire file hierarchy rooted at that directory is included. The effect of the copy is as if the copied files were written to an archive file and then subsequently extracted, except that there may be hard links between the original and the copied files (see the -1 option). While processing a damaged archive during a read or list operation, PAX attempts to recover from media defects and searches through the archive to locate and process the largest number of archive members possible (see the -e option, for more details on error handling).

The directory operand specifies a destination directory pathname. If the directory operand does not exist, or it is not writable by the user, or it is not of type directory, PAX exits with a non-zero exit status. A pattern operand may be used to select one or more pathnames of archive members. Archive members are selected using the pattern matching notation described by fnmatch(3). When the pattern operand is not supplied, all members of the archive are selected. When a pattern matches a directory, the entire file hierarchy rooted at that directory is selected. When a pattern operand does not select at least one archive member, PAX writes the pattern operands in a diagnostic message to standard error and then exits with a non-zero exit status.

When writing an archive, block the output at a positive decimal integer number of When writing an archive, block the output at a positive decimal integer number of bytes per write to the archive file. The blocksize must be a multiple of 512 bytes with a maximum of 32256 bytes. A blocksize can end with k or b to specify multiplication by 1024 (1K) or 512, respectively. A pair of blocksizes can be separated by x to indicate a product. A specific archive device may impose additional restrictions on the size of blocking it will support. When blocking is not specified, the default blocksize is dependent on the specific archive format being used. The default block size for character special archive files is 10240. All blocksizes less than or equal to 32256 that are multiples of 512 are supported.

Whenever PAX cannot create a file or a link when reading an archive or cannot find a file when writing an archive, or cannot preserve the user ID, group ID, or file mode when the -p option is specified, a diagnostic message is written to standard error and a non-zero exit status will be returned, but processing will continue. In the case where PAX cannot create a link to a file, PAX will not create a second copy of the file. If the extraction of a file from an archive is prematurely terminated by a signal or error, PAX may have only partially extracted a file the user wanted. Additionally, the file modes of extracted files and directories may have incorrect file bits, and the modification and access times may be wrong.

If the creation of an archive is prematurely terminated by a signal or error, PAX may have only partially created the archive which may violate the specific archive format specification. If while doing a copy, PAX detects a file is about to overwrite itself, the file is not copied, a diagnostic message is written to standard error and when PAX completes it will exit with a non-zero exit status.

File archival is also described in U.S. Pat. No. 6,003,044 entitled "Method and Apparatus for Efficiently Backing up Files Using Multiple Computer Systems" by Pongracz, et al. that is incorporated by reference herein in its entirety.

SUMMARY

A method and system in accordance with one aspect of the invention perform archival in a computer, by creating a process if an item to be copied is a directory, and alternatively by copying the item if the item is a file. In one embodiment, the created process in turn recursively performs the just-described acts, e.g. the act of creating or copying, with another item located in the just-described directory. Simultaneously (e.g. in case of two or more processors), or contemporaneously (in case of a single processor), the parent of the created process repeats the act of creating or copying with another item. Use of multiple processes speeds up archival, as compared to the use of a single process. Therefore, depending on the number of directories to be copied, a corresponding number of processes are created. In one embodiment, the number of created processes is limited by a maximum limit specified by an operator. When such a limit is specified, the creating process waits for the number to fall below the limit, before creating another process.

In accordance with another aspect of the invention, a copy process changes a default limit on a resource to a maximum limit for the resource prior to copying. For example, prior to creation of a process, the parent process (or the parent's parent) may change the limits, so that all processes created thereafter inherit the new limits. Examples of resources include: the number of open files, the file size, and the amount of available memory (which may be stack and/or heap). Increase of the limit on such resources helps in speeding up archival.

In accordance with yet another aspect of the invention, a copy process is speeded up by transferring data from the file into a temporary buffer, locking the temporary buffer, and invoking a direct memory access (DMA) process for making a copy from the temporary buffer. The copy process may be further speeded up by checking for circular links (such as a symbolic link that points to itself), and eliminating time otherwise spent by prior art techniques in attempting to copy circular links.

In accordance with still another aspect of the invention, a copy process sends an email message if a resource at a destination is full, and thereafter waits to be restarted subsequent to sending the email message. The process may identify an email address for such a message from a password file, based on an identity of a user that started the process. A user that receives the email may make appropriate arrangements (e.g. delete files in a destination disk or load a new disk), and therafter restart the process. On being restarted, the process recopies a file (from the beginning of the file) if it was in the middle of copying the file when it stopped.

DETAILED DESCRIPTION

A method and apparatus in one embodiment of the invention perform archival in a computer (such as an IBM PC or a Sun workstation), by copying files from one or more sources 101A-101N (wherein $A \leq I \leq N$, N being the total number of sources) to one or more destinations 102A-102M (wherein $A \leq J \leq M$, M being the total number of destinations). In this embodiment, sources 101A-101N can be specified as one or more lists of file names, and/or as names of directories that are each to be copied as a whole. Alternatively, the user can identify a list (also called "excluded list") of files and/or directories that need to be excluded.

Figure 1A:
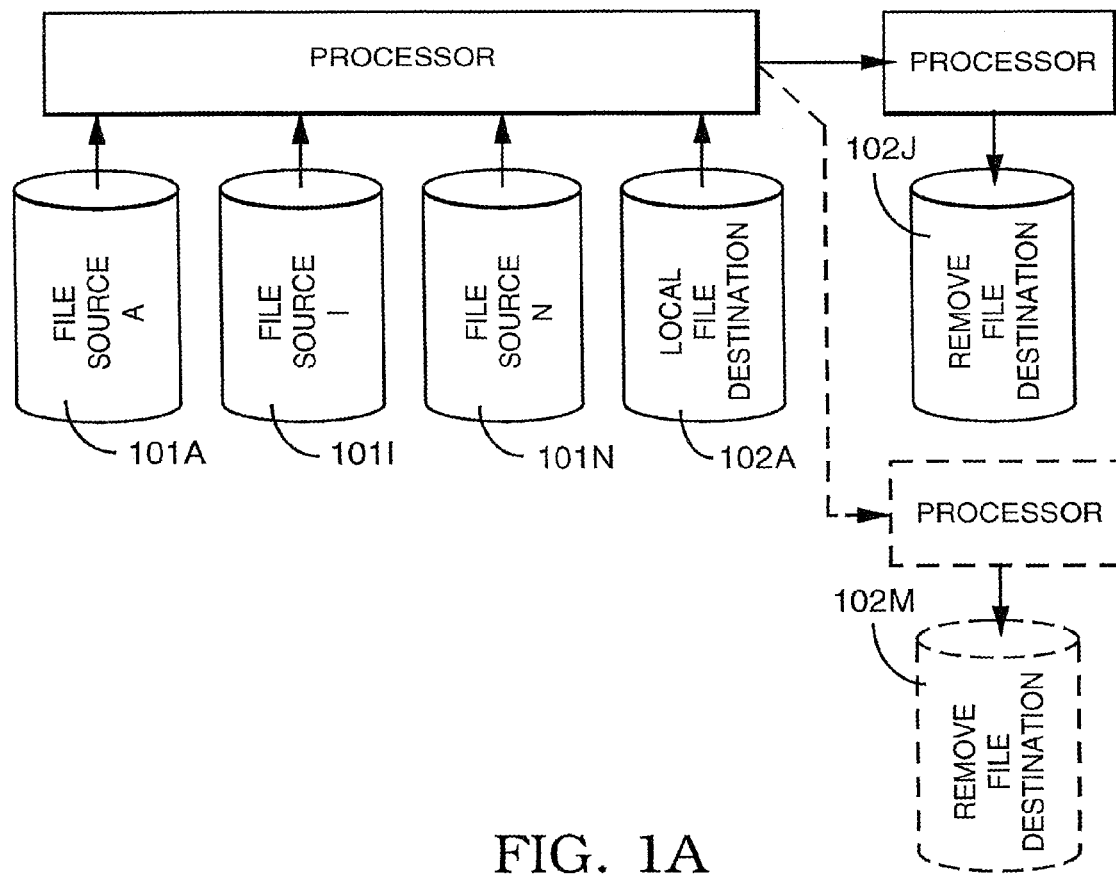
FIG. 1A illustrates, in a high-level block diagram, a system of one embodiment, for archival of files from multiple sources to multiple destinations.

Although FIG. 1A illustrates each file source 101I as a disk and each destination 102J as another disk, such sources and destinations need not be disks, and instead could be tapes, or other storage media. Moreover, such sources and destinations can be all on the same storage media (e.g. on the same disk), rather than being on separate storage media, as would be apparent to the skilled artisan in view of the disclosure.

Figure 2A:
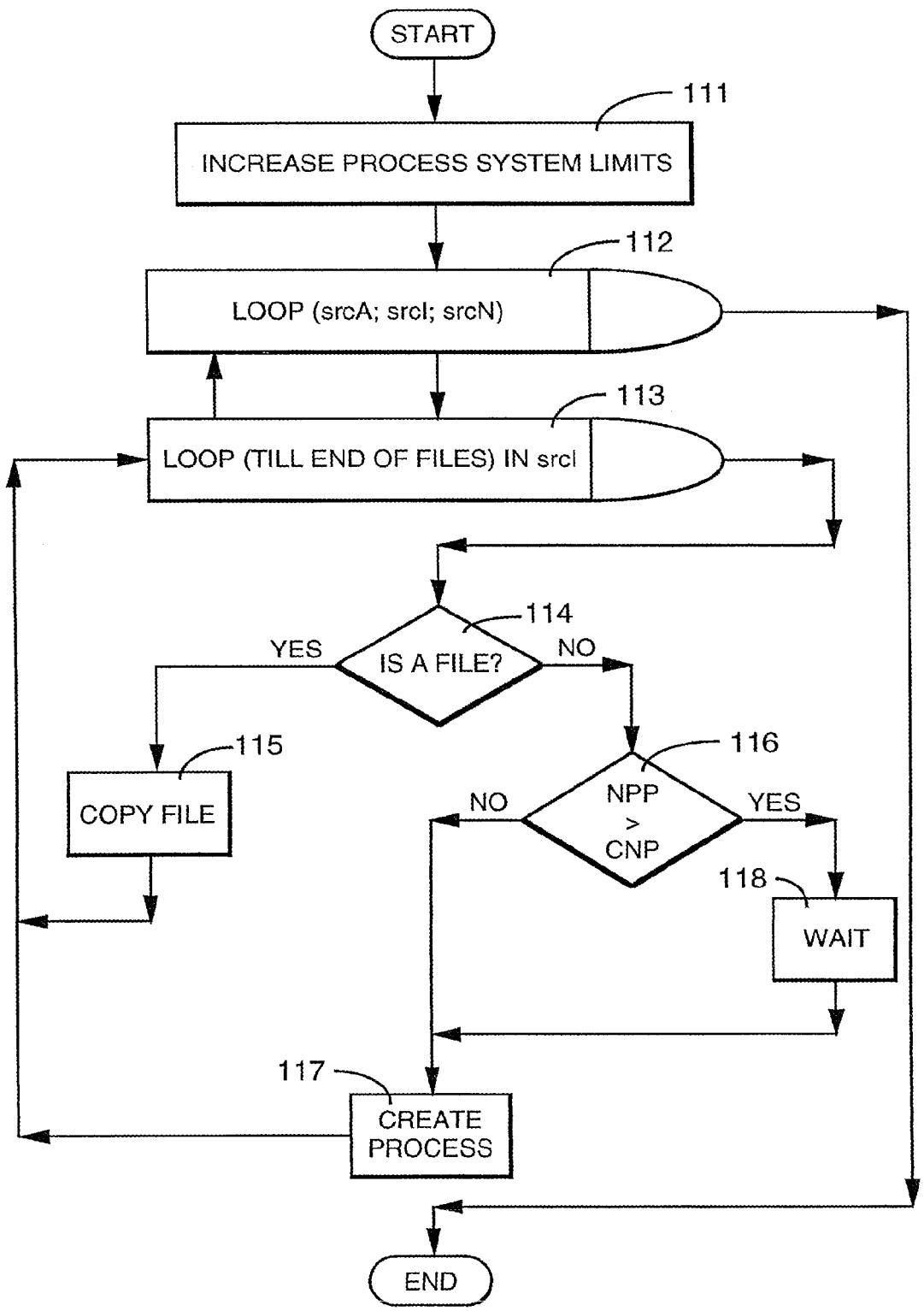
FIG. 2A illustrates, in a high-level flow chart, acts performed in one embodiment by a process of FIG. 1B.
Figure 2B:
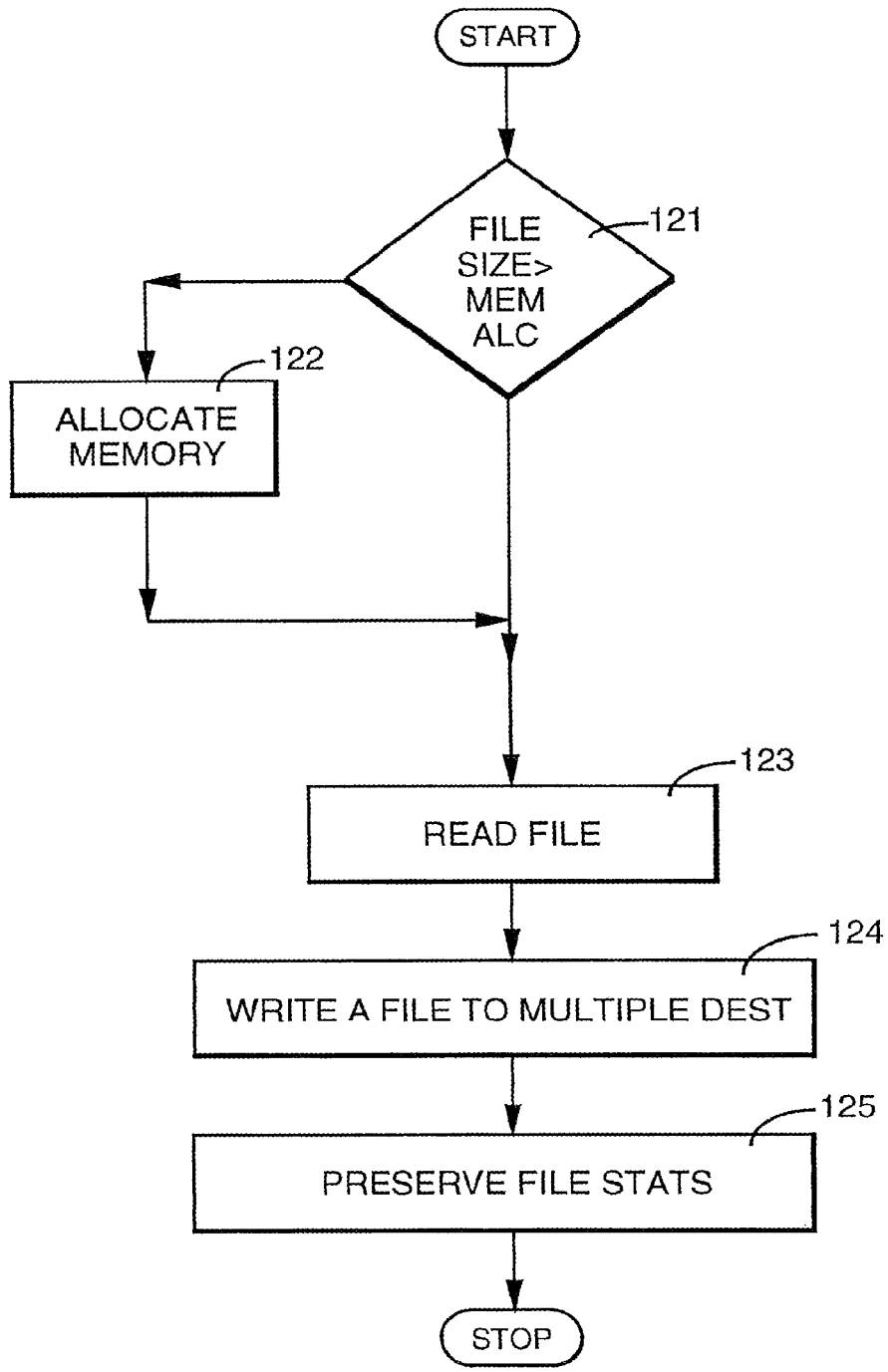
FIG. 2B illustrates, in a lower level flow chart, acts performed in a copy operation illustrated in FIG. 2A.

When started (by a command to the operating system), a process that implements the method has access to resources based on limits (called "default limits"), which may be lower than maximum limits allowed for the process. Therefore, in an optional act, the process changes the default limits (as illustrated by act 111 in FIG. 2A), to the maximum limits. Such changes may be implemented in the Unix operating system, by a call to the system function "getrlimit" to identify the maximum limit, followed by a call to another system function "setrlimit" to set the maximum limit as the default.

For example, a default limit on open files may be changed from 64 simultaneously open files to 1024 which is the maximum. In a similar manner other limits, such as stack size, heap size and file size are changed to their corresponding maximums. In one implementation, the heap size is not increased to its maximum, but to 10 less than the maximum, because on some platforms sometimes setting the limits to maximum was not successful.

Note that the new limits do not affect the current process (that changes the limits), but instead affect any new processes spawned (or forked) from the current process. In one implementation, the current process also sets itself as a process group (in an optional act not shown in FIG. 2A), so that termination of the current process terminates all processes spawned (or forked) from the current process. Next, in this implementation, the current process spawns a new process that receives the new limits, and then the current process waits on completion of the new process.

In one implementation, the new process has two loops, an outer loop 112 (FIG. 2A) on all the sources 110A-101N, and an inner loop 113 (FIG. 2A) on all files within each source 101I. Inside these loops, the process checks (see act 114 of FIG. 2A) if an item to be copied is a file and if so, simply copies the file (as illustrated by act 115). During such copying the file may be copied to multiple destinations, if specified.

If the item is not a file, then if the item is a directory, the process checks (see act 116 in FIG. 2A) if the number of processes that are currently executing is less than the maximum, and if so creates (see act 117) a new process and returns to loop 113, and otherwise waits (see act 118) until the number falls below the maximum. Therefore, the new process handles copying of the contents of the just-described directory, in a recursive manner. Depending on the implementation, such a process can have more loops or less loops (i.e. other than 2 loops).

Figure 1B:
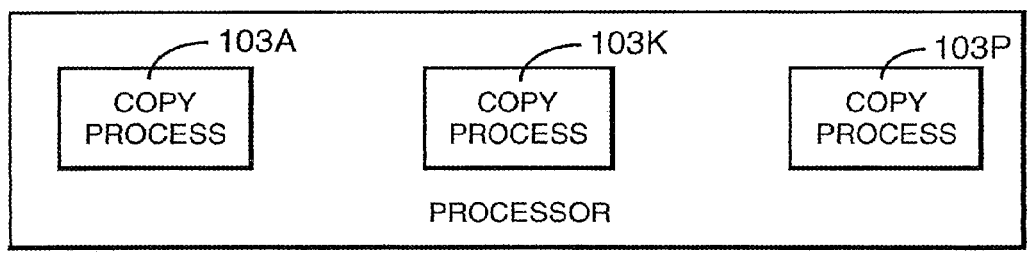
FIG. 1B illustrates, in an intermediate-level block diagram, use of multiple processes in the system of FIG. 1A, to perform copying.

At any given time, several processes 103A-103P (wherein $A \leq K \leq P$, P being the total number of processes) may be performing copy operations, e.g. on a corresponding number of directories. These copy processes 103A-103P are in addition to (and are spawned from) the above-described group process (not shown in FIG. 1B). Therefore, it is not necessary for each of processes 103A-103P to be killed individually, and instead they are all killed when the group process is killed.

Specifically, in one implementation, copy process 103K takes a source list the user has given, and opens each source directory, and traverses till the end, the complete tree. Prior to such tree traversal, copy process 103K first allocates memory for storing the absolute directory (complete name) and relative directory (current location of child), for use in identification and management (for use in creating the directory at the destination) of the files being copied.

Copy process 103K also allocates memory to hold data from each file being copied. In this implementation, copy process 103K initially requests the operating system to provide the maximum limit (e.g. 1 GB), and if unsuccessful requests half the previously requested amount repeatedly, until successful. Depending on the sources 101A-101N, the allocated memory may be larger than the size of each of a majority of files to be copied. If so, such copying can be performed with a single read operation (per file) to a source 101I, thereby to minimize the overall input/output (I/O) operations as compared to a prior art process (such as "CPIO" or "TAR") that copies one block (e.g. of 512 bytes) at a time.

For example, copy process 103K can copy a 1 MB file into the allocated memory in a single read operation (if the allocated memory is larger than 1 MB). If the file size is larger than the allocated memory, then multiple reads are required, although the number of such reads is likely to be smaller than in the prior art (depending on the size of the allocated memory). For example, an 80 MB file may be copied in 4 read operations if the allocated memory is only 20 MB.

In one implementation, copy process 103K checks that length of a directory name does not exceed a predetermined maximum length of a path (e.g. 1024). Next, copy process 103K stores in a stack the absolute and local paths to a current directory (e.g. by doing "sprintf" into a locally maintained stack, and changing a pointer inside the stack—the pointer moves up and down, always pointing to the beginning of the stack).

Figure 1C:
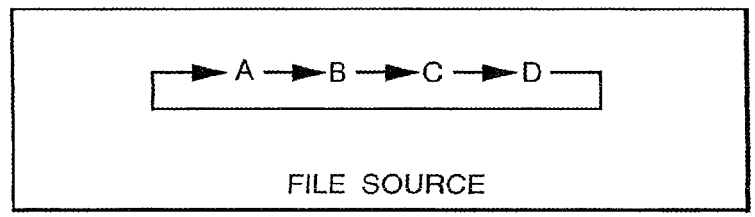
FIG. 1C illustrates, in a low-level block diagram, a circular link in a source of FIG. 1A.

If an entry in a source directory is a symbolic link, then copy process 103K checks if the symbolic link is circular (i.e. points back to itself as illustrated in FIG. 1C) and if so ignores the link. Process 103K does a traversal of the symbolic link, to find where the link is pointing to. For example, process 103K checks if current directory is pointing to parent directory, etc. Process 103K also checks if it is going beyond 1024 links when doing this check. Finally, process 103K does a string compare, and if it is the same file then it is a circular link. Process 103K also checks if the link is nonexistent or some junk, by checking if it exists. Process 103K calls "stat" which provides the statistics on the regular file from the system and "lstat" for link statistics.

If the symbolic link is nonexistent (or junk), copy process 103K blindly preserves the symbolic link. Since processes 103A-103P operate in parallel, another process 103A may be writing the file that is found to be "junk". So, process 103K processes only one directory, and the symbolic link may be to another directory that another process 103A is still copying. Therefore, the pointer may become a valid pointer after process 103A is completed. Process 103K keeps traversing a symbolic link until it finds (1) a regular file, (2) circular link or (3) nonexistent file (or junk).

If the symbolic link points to a file or a directory, then a copy of the link is formed at the destination, and thereafter the following acts are performed (depending on the nature of the entry). If an entry in a source directory is (or a symbolic link points to) a file, then copy process 103K copies the file. Prior to copying the file, process 103K creates a directory at the destination. Specifically, process 103K combines the destination directory given by the user with relative directory and current directory name, to form the destination address. During directory creation, or file copying, process 103K preserves the time stamps and permissions. Also, during the directory creation or file copying if there is an error about insufficient space at the destination, process 103K sends email to the user and waits for the user (as discussed below in detail). When multiple destinations are specified, the waiting for user affects copying for all destinations, not just the destination having insufficient space.

Note that process 103K performs a forcible copy, and if the destination file is previously there, then process 103K "unlinks" that file and copies the new file. Also, during the file copy itself, process 103K creates a destination file (if it already exists, process 103K does "unlink") and then process 103K truncates the file to 0 bytes. Process 103K may get an error saying no space on disk, in which case process 103K sends email (as described below).

Also unlike a prior art process (such as "CPIO" or "TAR") that copies data one block (e.g. of 512 bytes) at a time, first into a user's area in memory and then into a kernel area, copy process 103K copies the data only once, directly into the above-described allocated memory, and thereafter invokes direct memory accesss (DMA) to copy the data from the allocated memory. Therefore, prior to any copying, copy process 103K locks the allocated memory, so that the memory is available during DMA.

If an entry in the source directory is another directory, copy process 103K uses a limit "npp" on the number of parallel processes (which is specified by the user, and if user doesn't provide it, defaults to a predetermined number such as 10) to determine if another process can be created. For example, if the system has eight CPUs, the user may specify npp to be 8 or 16 (i.e. one process per CPU or two processes per CPU). Therefore, the process compares "npp" with a variable "cnp" which identifies the "current number of processes" and starts at 1. If "cnp" is less than "npp" then the new process forks a child process. So, many processes operate in parallel, to perform copying of different directories.

In one embodiment, a new process is not created for entries (also called "items") in a directory that are normally present and relate to the directory structure, such as the entries "." for current directory and ".." for parent directory. Also, depending on the embodiment, a new process may not be created for the directory "lost+found" which is a directory created by the Unix operating system. Also, a new process may not be created if the directory is in an excluded list (described above).

As noted above, when the destination disk is full, process 103K sends an email message to the operator. Specifically, process 103K sends the email to an address identified in an environmental variable "ALERT_USER". If this variable is not set, process 103K identifies the current user whoever is running the process, and identifies their email address (e.g. in Unix by reading the /etc/password to get user information, obtain the user's email id from the password file.)

Next, process 103K creates a temporary file for holding the email message. If the disk doesn't have any space, process 103K creates a file whereever the disk space is available (e.g. in various directories such as \tmp or home directory of the user). Process 103K only needs about 1 KB to hold the email message. Next, process 103K writes the mail message into a temporary file, and then invokes a system command (e.g. mailx in Unix) to send the mail message. Then process 103K removes the file (e.g. by invoking the unlink function). Process 103K also sends a signal to itself to stop (e.g. kill(getpid( ), SIGSTOP) in Unix). So, user is notified and process 103K is stopped at this time, and the user must cleanup somewhere to continue the copying. Next, user must send a continue signal to process 103K, after the user has cleaned up the disk. The user may issue a command "kill -CONT 'pid'" in the Unix operating system, and then process 103K continues its operation. The "kill" command is a system call that stops or starts the process. The mail message provides the process id to the user, which the user needs to restart the process. On restarting, process 103K starts back in the copy function, which resets the file descriptor to the beginning (the current minus the number of bytes we have written).

Then process 103K re-writes the whole file (although in another embodiment it simply continues from where it left off, e.g. using "lseek" system call to move a file pointer to anywhere inside the file). As process 103K knows the location of where the last character was written, it can continue. So, the destination file can be grown after clean up, with the operating system keeping track of where the blocks are located. Each block has a pointer to the next block, with the operating system updating the pointers. When asked to write a number of bytes to the disk, the operating system gets the free blocks, and sets up a pointer from one block to the next block. At the time of writing a large block (say 1 GB block), operating system copies one block at a time.

Note that instead of generating an email message when a destination disk is full, such email messages may be generated even when other errors are encountered, in which case the appropriate error notification is included in the email message.

In one embodiment, process 103K performs the above-described traversal of a directory for all the files and directories therein, and if it sees a file it copies and otherwise forks a process also as noted above. During such a traversal if process 103K reaches maximum limit on the number of directories that can be held in the above-described stack which contains the absolute and local paths to a current directory. Process 103K does the same operations but calls itself in a recursive fashion (at the end) to use the operating system's memory normally used as stack area. Note that the above-described stack is limited in size because process 103K allocates the rest of the memory for copying purposes (except for 4 bytes which contain two variables that identify the source file and destination file that is being copied at any given time).

Therefore, when process 103K runs out of space allocated for the above-described stack, process 103K uses the operating system's stack space, by making recursive calls, and traverses through all the directories recursively. Recursive calls are not done until process 103K runs out of space for the above-described stack. The above-described stack is used for holding the list of directories that are being traversed (or need to be traversed depending on the implementation). The remaining allocated memory for process 103K holds global variables, and a temporary buffer for transferring the data from/to disk. As noted above, the temporary buffer is locked and DMA process is told to make a copy.

One implementation of the method and system described herein is illustrated in a software description that is attached hereto as an Appendix (below). This specific implementation performs a parallel copy, wherein the maximum number N of parallel process at any given time is a command line option, with one process being created for each directory. Such implementation can copy a list of directories, and when a −1 option is used the user can select directories that user wants to copy. Also, in such an implementation, there can be multiple source directories and multiple destination directories. Such an implementation may also identify circular links, in order to avoid looping. Also, such an implementation can preserve time stamp and permissions for the files being copied. Furthermore, such an implementation may overwrite files at the destination, unless the owner is not the same.

Moreover, when a destination disk is full in the middle of a copy, this implementation sends email to ALERT_USER, which is an environment variable. If this varible is not set, the email is optionally sent to the userid who started the copy method, and the same information may be written to the terminal tty. Also, this implementation waits until disk space is available. If multiple destinations are selected, and one destination is out of disk space, this implemntation keeps other destinations waiting until disk space is available at the one destination. However, in this implementation, if multiple destinations are given and if those directories are NFS mounted, then if one network is slow other directories will also become slow. Such an implementation can be provided with an option to ignore certain specified files during the copy operation. Also, such an implementation can be provided with an option to not preserve symbolic links, but to copy files in place of such links.

Note that various functions and/or software and/or data structures described herein are not limited to use in an archival process, and instead may be used with other processes as will be apparent to the skilled artisan. For example, the user notification feature (e.g. use of an email message) can be used in a process that performs file download in a local computer from a remote computer. As another example, the user notification can be used in a disk defragmentation process, or in a process that performs virus checks as would be apparent to the skilled artisan in view of the disclosure. Therefore, any process that can run without the user's presence but which requires the user's assistance in certain situations can use the user notification feature when the situations arise.

Numerous modifications and adaptations of the embodiments are encompassed by the attached claims.

APPENDIX

Function getmntent( ) returns one entry from /etc/filesystems for each call. Returns: 0 if successfully found next entry; >0 if any error; and <0 on Eof. This function is implemented for platforms which do not provide "getmntent" in their standard libraries.

Function getmnt_ent( ) returns next mount point. Calls function getmntent( ).

Function write_mesg( ) writes a mail message to the operator. Function write_mesg( ) receives as inputs the following: a file name to which the message is to be written, a process id which identifies the process being stopped so that the process can be restarted by the operator, a source directory that identifies the location where the archival has been stopped, a destination directory that identifies the location at which the there was insufficient disk space, and name of the file system at the destination. Function write_mesg( ) includes instruction on how to restart the stopped process, e.g. contains the instruction "type 'kill-CONT pid' to continue copying" wherein pid is replaced with the process id described above.

Function getDirName( ) gets parent's directory name for the path. Function getDirName( ) receives as input the path and a character "ch" and returns a string till last occurence of ch.

Function getmpoint( ) returns mount point for a path by parsing through "." and "\" or "/" depending on the file system (Unix or Windows). Function getmpointo receives as input a pointer to the path. Calls functions getDirName( ) and getmnt_ent( ).

Function sendmail( ) sends mail to the environmental variable ALERT_USER (or if this is null to the operator that started this process) indicating disk is full. Function sendmail( ) first finds some temporary location to create a file to hold the message, e.g. in the "/tmp" directory, or user's home directory. Calls function write_mesg( ). Receives as inputs the source path (which is simply passed to write_mesg), and the destination path (which is used with functions getDirName and getmpoint to identify the name of destination file system to function write_mesg).

Function basename( ) returns a string from the last occurence of the char ch to the end of a path. Receives as input path and character ch.

Function readln( ) reads next line from the file descriptor, and copies the line into buffer and returns the number of bytes read. Specifically, it receives as input the file descriptor and a pointer to a buffer in which the line is stored, and it provides as output the number of bytes read.

Function isFileIsDir( ) receives as input a path, and returns one of RT_DIR if path is a directory, RT_FILE if path is a file, RT_SYM if path is a symbolic link, and RT_ERR if there is an error or any spacial files or circular link. Checks if path is a symbolic link by looking at the attributes of the directory entry. For example, checks if (mode & S_IFMT)==S_IFLNK, wherein mode is of an entry in the directory, and if so, reads where path is linked to by making a system call readlink( ) If the path is linked to ".." then returns RT_ERR due to circular link. Change directory to path and if successful return RT_SYM, and else path is not a sym link to regular file, so change back to working directory. If the path is linked to "." again return RT_ERR due to circular link. Also, string compare path with current directory, to see if the file is linked to itself, e.g. /tmp/foo→/tmp/foo, and again returns RT_ERR due to circular link. Note that this function checks for circular links, both as absolute paths, and also as paths relative to the current directory. Calls function basename( ) to parse portions of a filename before and after a "."

Function copy( ) copies all files identified by an input variable src_file to a destination identified by another input variable dest_dirs, and a third input variable srcf holds the source filename only, and is used when the same source is copied to multiple destination directories. Loops on a variable "done" while the value is 0 which indicates that the src_file is a symbolic link. Inside the loop, function copy( ) checks if the user has opted to preserve the symbolic link, or copy the file/directory at the destination. If the user has opted to copy the file instead of a symbolic link, function copy( ) continues to loop until it finds a directory/file, or a circular link or a bad link. The default is for function copy( ) to keep (i.e. copy) symbolic links, if the user did not specify an option. If a file is found, function copy( ) copies the file. If a directory is found, function copy( ) copies the entire directory. If a bad link or a circular link is found, function copy warns the user. During the looping, checks if the src_file is a symbolic link to relative path, i.e. compares the src_file to current location (obtained by calling function getDirName), and if so returns without any copying, but warning the user because a circular link is found. This function also checks if the directory entry has a link attribute, e.g. checks if mode (as described above in reference to function isFileIsDir) and if it is a link it is necessary to recurse one more time, else checking if (mode & S_IFMT)==S_IFDIR) in which case variable done is set to 1 and otherwise to 2. Function copy( ) also spawns a new process ("child") when done is 1 (because a directory is to be copied), and if the spawn fails simply sleeps for 5 seconds, and tries again. The new process ("child") performs the function scanDirs( ). Function copy( ) also checks if the destination disk is full, and if so invokes function sendmail (described above) to wait for disk space to be made available.

Function rec_dir( ) recursively travels into a directory till the end leaf, and copies if the leaf is regular file, makes symbolic link if a leaf is symlink, and otherwise creates a directory. One embodiment does not use recursive functioning due to stack growth. Receives as inputs two names, a relative directory name and an absolute directory name. Checks if string length of the first name is greater than PATH_MAX (which is 1024 in one embodiment), and if so signals an error and returns. Reads the directory entries till Eof, and ignores ".", ".." and "lost+found" entries. Calls function isFileIsDir( ) with each file name, ignores any errors, and copies the entry if it is a file or a link. Creates directories at destination. If the destination disk is full, function rec_dir( ) also invokes function sendmail (described above) to wait for disk space to be made available. Function rec_dir( ) is called by function scanDirs( ) when there is insufficient memory in the stack (i.e. overflow of stack), and by function copy( ) to traverse the directory which is a symbolic link and if the user opted not to preserve symbolic links.

Function scanDirs( ) accepts two arguments, abspathofdir and relDirName. This function has two stacks, one for storing the absolute path of source directory (e.g. abspathofdir), and another for storing relative path from the source directory (e.g. relDirName). This function traverses the absolute path of the directory and does the following: if it finds a file or symbolic link, it calls function copy( ) to copy the file or link, and if it finds a directory it pushes the paths (both relative path and absolute path) to this directory into the stacks. The just-described action of copying or pushing on stack is repeated for each entry (which can be, e.g. a file, a link or a directory) in the current directory. This function, before copying, verifies should this file needs to be copied or not (user can have this file to be excluded). When creating a destination directory, if the destination disk is full, function scanDirs( ) also invokes function sendmail (described above) to wait for disk space to be made available. When all entries in the current directory have been processed, the stacks are popped (i.e. the values from the stacks are set to current directory) and the just-described operation is performed on the current directory. Such processing of directories from the stacks continues until the stacks are empty. In case of stack overflow, this function (i.e. scanDirs) calls function rec_dir (discussed in previous paragraph) to proceed from the directory.

Function usage( ) echoes the user's usage of this tool. This function is called whenever the user uses the wrong options.

Function exclude_thisfile ( ) performs the following operation. Before copying each file, checks the file name in a specific file which contains a list of filenames to be excluded when the user uses an exclude option. Using this option slows down the copying process.

Function make_arglist( ) checks the command line argument and overwrites the default values with the user-provided values. For example, the number of processes, by default is 10 but can be overwritten by the user.

Function increase_limits( ) increases various resource limits, such as stack size, heap size, number of file open descriptors and file size.

Function copy_srcfile( ) is called by the function main (described below) with the source file name and relative path as arguments. This function calls function copy( ) (described above) if source file name is a regular file or symbolic link. If it is a directory, this function checks the number of parallel processes running. If the number of parallel processes is less than a limit "numproc" (which may be set by the user; by default this number is set to 10), then it forks a child process, and the child process calls function scandirs ( ), and the parent process returns to the function main.

Function main( ) calls function increase_limits ( ) (described above), sets the process as a group leader, forks a child and waits for the child. Child calls function make_arglist( ) (described above), to verify command line arguments, and opens /dev/tty for writing messages to the user. Child then loops through all the source directories, to perform copying: scans each source directory and for each entry, calls function copy_srcfile (which spawns a child and returns as described above). On return, the child checks if exclude or include option is used. If exclude option is set in the command line option, then it calls function exclude_thisfile ( ) (described above). If include option (i.e. copy only listed files) is set, copies only the listed files instead of scanning the source directory (i.e. reads from the listed files and copies them by calling function copy_srcfile). If neither the exclude nor the include option are set, then the child calls function copy_srcfile, thereby to recursively spawn additional child processes if necessary. On return from the function copy_srcfile, this child waits for all its child processes to finish.

The invention claimed is:

1. A method of copying a plurality of items, the method being implemented in a computer, the method comprising:
   a parent process in said computer checking if a first item in said plurality is a file or a directory;
   the parent process in said computer copying the first item to at least one storage media if the first item is found during the checking to be a file and the parent process creating a child process in said computer if the first item is found during the checking to be a directory;
   if the first item is found during the checking to be a directory, the child process in said computer checking if another item in the directory represented by the first item is a file or a directory; and
   if the first item is found during the checking to be a file, the parent process in said computer checking if a second item in said plurality is a file or a directory;
   wherein at least one item in said plurality of items is copied to said at least one storage media.

2. The method of claim 1 further comprising, prior to the creating:
   comparing a current number of processes, created for copying, with a limit; and waiting if the current number is greater than or equal to the limit.

3. The method of claim 1 further comprising, prior to the creating:
the parent process increasing a limit on a resource; and
the child process using the resource at the increased limit during copying.

4. The method of claim 3 wherein:
the resource is number of open files.

5. The method of claim 3 wherein:
the resource is file size.

6. The method of claim 3 wherein:
the resource is memory.

7. The method of claim 6 wherein:
the memory is organized as a stack.

8. The method of claim 6 wherein:
the memory is organized as a heap.

9. The method of claim 1 wherein the copying comprises:
transferring data from the file into a temporary buffer;
locking the temporary buffer; and
invoking a direct memory access (DMA) process for making a copy from the temporary buffer.

10. The method of claim 1 further comprising prior to the copying:
the parent process checking if the first item is a link to itself, and performing said copying only if the first item is not a link to itself.

11. The method of claim 10 wherein:
the checking includes a string comparison operation.

12. The method of claim 1 further comprising, during the copying:
the parent process sending an email message if a resource at a destination is full;
wherein the email message is sent to an email address of a user that started the method.

13. The method of claim 12 further comprising, during the copying:
waiting to be restarted subsequent to sending the email message.

14. The method of claim 13 wherein said waiting comprises:
sending a signal to self to suspend execution.

15. The method of claim 13 further comprising, during the copying:
recopying said file from beginning, on being restarted.

16. The method of claim 12 wherein:
the email address is identified from a password file based on an identity of said user.

17. The method of claim 1 wherein:
said creating is performed only if said directory is not a current directory and not a parent directory.

18. The method of claim 1 wherein:
the parent process is started with an instruction to perform said method for each item in the directory.

19. The method of claim 1 wherein:
the number of processes created corresponds to the number of directories to be copied.

20. The method of claim I further comprising:
checking if the file is in a list of items to be excluded from copying; and
performing said copying only if the file is not in said list.

21. The method of claim 1 wherein:
the file is copied to multiple destinations if specified by the user.

22. The method of claim 1 further comprising:
the child process copying said another item to said at least one storage media if said another item is found to be a file and the child process creating another child process in said computer if said another item is found to be a directory; and
the parent process copying the second item to said at least one storage media if the second item is found to be a file and the parent process creating yet another child process in said computer if the second item is found to be a directory.

23. A computer for copying a plurality of items, the computer comprising:
a processor comprising means for checking if an item to be copied in said plurality of items is a file or a directory; and
said processor further comprising means for copying the item to a storage media if the item is a file and creating a child process if the item is a directory;
wherein said child process comprises a copy of said means for checking and said means for copying and creating;
wherein when each item is input to said processor at least one item in said plurality of items is copied to said storage media.

24. The computer of claim 23 further comprising: means for sending an email message if the means for copying encounters an error.

25. The computer of claim 23 further comprising:
means for increasing a limit on a resource to maximum.

26. The computer of claim 23 wherein said means for copying comprises: means for transferring data from the file into a temporary buffer; means for locking the temporary buffer; and means for using direct memory access (DMA) to make a copy from the temporary buffer.

27. The computer of claim 23 further comprising:
means for checking if the item is a link to itself.

28. A computer readable storage medium encoded with software, the software comprising instructions to archive an item in a computer by:
using a current process to check if said item is a file or a directory;
using the current process to copy the item to a storage media if the item is found during checking to be a file and creating a new process if the item is found during checking to be a directory; and
using the new process if created to check another item in the directory represented by said item;
wherein the new process if created executes simultaneously or contemporaneously with the current process; and
wherein at least one item is copied to at least said storage media.

29. The medium of claim 28 wherein:
the current process calls a function to recursively spawn a plurality of new processes including said new process; and
on return from the function, the current process waits for all new processes to finish.

30. A method of copying a plurality of items, the method being implemented in a computer, the method comprising:
a parent process in said computer checking if a first item in said plurality is a file or a directory:
the parent process in said computer copying the first item to at least one storage media if the first item is found during the checking to be a file and the parent process creating a child process in said computer if the first item is found during the checking to be a directory:

if the first item is found during the checking to be a directory, the child process in said computer checking if another item in the directory represented by the first item is a file or a directory; and if the first item is found during the checking to be a file, the parent process in said computer checking if a second item in said plurality is a file or a directory;

wherein at least one item in said plurality of items is copied to said at least one storage media; and wherein, if the first item is found during the checking to be a directory:

said child process in said computer is created after said parent process changes a default limit on a resource to a maximum limit;

after said creation, the child process inherits the maximum limit prior to performing the checking, the copying and the creating;

at least one of the parent process and the child process:

allocates memory to hold at least a temporary buffer and a stack, stores in said stack an absolute path and a local path to said directory, checks if an entry in said directory is a symbolic link, checks if the symbolic link is circular, and ignores the symbolic link if circular;

checks if a destination is full and sends an email message if a result thereof is true and waits to be restarted subsequent to said sending; and transfers data to said temporary buffer, locks said temporary buffer and invokes a direct memory access process for making a copy from said temporary buffer to said destination.

31. The method of claim 30 further comprising:

using operating system stack space in said computer by making recursive calls when memory allocated for said stack is used up.

32. A computer readable storage medium comprising software that when executed causes a computer to perform a method, the software comprising:

a plurality of first instructions to check if a first item received as input is a file;

a plurality of second instructions, responsive to the first item being found to be a file, to copy the first item to at least one storage media;

a plurality of third instructions, responsive to the first item being found to be not a file and using as input a second item within a directory represented by said first item, to create a child process to execute said first instructions and to execute either said second instructions or said third instructions depending on whether said second item is a file;

wherein on execution of said software at least one of said first item and said second item is copied by said computer to at least said storage media.

33. The computer readable storage medium of claim 32 further comprising: a plurality of fourth instructions to check if the first item is a link to itself.

34. The computer readable storage medium of claim 32 wherein: the plurality of second instructions comprise instructions to check if said storage media is full and if so to send an email message.

35. The computer readable storage medium of claim 32 further comprising:

a plurality of fourth instructions to be executed prior to creation of said child process, to compare a current number of child processes against a limit.

36. The computer readable storage medium of claim 32 comprising: a plurality of fourth instructions to be executed prior to creation of said child process to increase a limit on a resource.

37. The computer readable storage medium of claim 36 wherein: the resource is number of open files.

38. The computer readable storage medium of claim 37 wherein the software further comprising:

instructions to use operating system stack space in said computer by making recursive calls when memory allocated for said stack is used up.

39. The computer readable storage medium of claim 36 wherein: the resource is file size.

40. The computer readable storage medium of claim 36 wherein: the resource is memory.

41. The computer readable storage medium of claim 32 comprising: a plurality of fourth instructions to be executed prior to said first instructions, to check if an item in said plurality of items is in a list of items to be excluded from copying. for using direct memory access (DMA) to make a copy from the temporary buffer.

42. A computer readable storage medium comprising software that when executed causes a computer to copy a plurality of items, the software comprising:

instructions, for a parent process in said computer, to check if a first item in said plurality is a file or a directory;

instructions for the parent process in said computer to copy the first item to at least one storage media if the first item is found to be a file, and instructions for the parent process to create a child process in said computer if the first item is found to be a directory;

instructions to be executed if the first item is found to be a directory, for the child process in said computer to check if another item in the directory represented by the first item is a file or a directory; and instructions to be executed if the first item is found to be a file, for the parent process in said computer to check if a second item in said plurality is a file or a directory;

wherein by execution of said instructions, at least one item in said plurality of items is copied to said at least one storage media; and wherein during execution of said instructions, if the first item is found to be a directory:

said child process in said computer is created after said parent process changes a default limit on a resource to a maximum limit;

after said creation, the child process inherits the maximum limit prior to performing the checking, the copying and the creating; at least one of the parent process and the child process: allocates memory to hold at least a temporary buffer and a stack, stores in said stack an absolute path and a local path to said directory, checks if an entry in said directory is a symbolic link, checks if the symbolic link is circular, and ignores the symbolic link if circular; checks if a destination is full and sends an email message if a result thereof is true and waits to be restarted subsequent to said sending; and transfers data to said temporary buffer, locks said temporary buffer and invokes a direct memory access process for making a copy from said temporary buffer to said destination.

* * * * *

UNITED STATES PATENT AND TRADEMARK OFFICE
CERTIFICATE OF CORRECTION

PATENT NO. : 7,546,305 B2 Page 1 of 2
APPLICATION NO. : 09/834833
DATED : June 9, 2009
INVENTOR(S) : Ramaprakash H. Sathyanarayan It is certified that error appears in the above-identified patent and that said Letters Patent is hereby corrected as shown below:

On the Title Pg, Item (57), in "Abstract", line 21, delete "therafter" and insert -- thereafter --, therefor.

On the Title Pg, Item (56), under "Other Publications", line 25, delete "Austrailain" and insert -- Australian --, therefor.

In column 1, line 46-47, below "status." delete "When writing an archive, block the output at a positive decimal integer number of".

In column 2, line 65, delete "therafter" and insert -- thereafter --, therefor.

In column 3, line 65, delete "110A-101N," and insert -- 101A-101N, --, therefor.

In column 5, line 4, delete ""1stat"" and insert -- "Istat" --, therefor.

In column 5, line 45, delete "accesss" and insert -- access --, therefor.

In column 6, line 13, delete "whereever" and insert -- wherever --, therefor.

In column 6, line 44, delete "1 GB" and insert -- 1GB --, therefor.

In column 7, line 27, delete "varible" and insert -- variable --, therefor.

In column 7, line 32, delete "implemntation" and insert -- implementation --, therefor.

In column 8, line 19, delete "getmpointo" and insert -- getmpoint() --, therefor.

In column 8, line 43, delete "spacial" and insert -- special --, therefor.

In column 8, line 58, after "a "."" insert -- . --.

In column 9, line 7, delete "copy" and insert -- copy() --, therefor.

Signed and Sealed this

First Day of June, 2010

David J. Kappos
*Director of the United States Patent and Trademark Office*

CERTIFICATE OF CORRECTION (continued)
U.S. Pat. No. 7,546,305 B2

In column 9, line 44, delete "abspathofdir" and insert -- abspathofDir --, therefor.

In column 9, line 46, delete "abspathofdir" and insert -- abspathofDir --, therefor.

In column 13, line 54, in claim 33, delete "compnsing" and insert -- comprising --, therefor.

In column 14, line 20-21, in claim 41, after "copying." delete "for using direct memory access (DMA) to make a copy from the temporary buffer.".